United States Patent [19]

Brocard et al.

[11] Patent Number: 5,797,266
[45] Date of Patent: Aug. 25, 1998

[54] DEVICE FOR ACTIVELY CONTROLLING COMBUSTION INSTABILITIES AND FOR DECOKING A FUEL INJECTOR

[75] Inventors: Jean-Marie Brocard, Rubelles; Jean-Yves Capelle, Monthlery; Michel André Albert Desaulty; Jean-Paul Perrin, both of Vert Saint Denis; Alain Michel Varizat, Yerres, all of France

[73] Assignee: Societe Nationale d'Etude et de Construction de Moteurs d'Aviation Snecma, Paris, France

[21] Appl. No.: 552,015

[22] Filed: Nov. 2, 1995

[30] Foreign Application Priority Data

Nov. 9, 1994 [FR] France .................. 94 13434

[51] Int. Cl.$^6$ ........................................... F02C 7/22
[52] U.S. Cl. ........................... 60/725; 60/740; 431/1
[58] Field of Search .................. 60/39.281, 725, 60/734, 740; 431/1

[56] References Cited

U.S. PATENT DOCUMENTS

| | | | |
|---|---|---|---|
| 3,053,047 | 9/1962 | Bodemuller | 60/39.281 |
| 3,946,551 | 3/1976 | Linebrink et al. | 60/39.281 |
| 4,605,167 | 8/1986 | Maehara | |
| 5,145,355 | 9/1992 | Poinsot | 431/1 |
| 5,199,641 | 4/1993 | Hohm et al. | |

FOREIGN PATENT DOCUMENTS

| | | |
|---|---|---|
| 0 601 608 | 6/1994 | European Pat. Off. |
| 35 33 975 | 3/1987 | Germany . |
| 40 40 745 | 7/1991 | Germany . |
| 2 205 384 | 12/1988 | United Kingdom . |

*Primary Examiner*—Louis J. Casaregola
*Attorney, Agent, or Firm*—Oblon, Spivak, McClelland, Maier & Neustadt, P.C.

[57] ABSTRACT

A device for actively controlling combustion instabilities and for decoking fuel injectors comprises at least one detector for measuring pressure fluctuations in a combustion or afterburner chamber, means for processing the signal output by the detector and providing, in turn, a control voltage, and at least one piezoelectric device which is disposed in a hydraulic line including a fuel injector for the supply of fuel to the combustion or afterburner chamber and which is responsive to the control voltage to generate pulses in the flow of fuel from the outlet of the fuel injector.

12 Claims, 3 Drawing Sheets

DEVICE FOR ACTIVELY CONTROLLING COMBUSTION INSTABILITIES AND FOR DECOKING A FUEL INJECTOR

BACKGROUND OF THE INVENTION

1. Field of the Invention

The present invention relates to a device for actively controlling combustion instabilities and for decoking fuel injectors. Such a device is particularly useful in aircraft engines, and may be used, on one hand, to control combustion instabilities in a combustion or afterburner chamber and reduce nitrogen oxide ($NO_x$) emissions, and on the other hand to decoke fuel injectors in situ without dismantling them.

Combustion instabilities are wide amplitude oscillations which appear in all types of combustion or afterburner chambers in which high heat outputs are produced. These instabilities correspond generally to cavity modes which are excited by a coupling between the unsteady pressure field and the release of energy. The oscillations are particularly harmful as they bring about vibrations which can lead to deterioration of certain elements, they give rise to an increase in the emitted noise level, and can even cause progressive destruction of the fuel injectors.

2. Summary of the Prior Art

The standard way of damping vibrations inside a combustion chamber involves the use of passive devices such as soundproofing linings or Helmholtz resonators. These devices are generally complex, costly, and take up a substantial amount of space, which leads to difficulties in implementing them. Moreover, most of these devices are ineffective for suppressing low-frequency oscillations below 500 Hz.

There are also devices for actively controlling combustion instabilities in which the flow of fuel injected into the combustion chamber is modulated depending on the instabilities detected. Flow modulation may be achieved by using a loudspeaker, or a vibrating membrane. However, these devices are not very reliable and pose aging and temperature resistance problems. Flow modulation can also be achieved for low frequencies by means of a servo valve, but while such systems are effective at low frequencies they do not operate beyond a few hundred Hertz. Moreover, none of these systems are capable of also decoking fuel injectors, an operation which requires operating at frequencies reaching at least one hundred kHz or so.

SUMMARY OF THE INVENTION

One object of the invention is to overcome the drawbacks of the existing devices and to provide a device for actively controlling combustion instabilities which is effective both at low frequencies (a few hundred Hertz) and at high frequencies (several kHz).

Another object of the invention is to provide a device for actively controlling combustion instabilities which is also operable within the ultrasonic frequency range up to a hundred kHz or so, in order to achieve decoking of fuel injectors without having to dismantle them.

Accordingly, there is provided a device for actively controlling combustion instabilities in a combustion or afterburner chamber provided with a hydraulic line for the supply of fuel to said chamber and a fuel injector defining an injection orifice, and for decoking said fuel injector, said device comprising at least one detector for measuring pressure fluctuations in said combustion or afterburner chamber and providing an output signal, means for processing said output signal from said detector and providing, in turn, a control voltage, and at least one piezoelectric device disposed in said hydraulic fuel supply line for generating, in response to said control voltage, pulses in the flow of fuel from said injection orifice of said fuel injector.

In order to reduce or suppress combustion instabilities, the device in accordance with the invention is used to record the unsteady behaviour of the flames by means of a detector such as a pressure sensor or an optical probe, analyze the detected signal, and modulate the fuel flow rate in a phase-shifted manner so that maximum energy release takes place during the periods when dynamic pressure is at its minimum. The modulation of the flow rate of the fuel is controlled by the piezoelectric device which is disposed in the fuel feed line of a fuel injector of the combustion or afterburner chamber. The piezoelectric device is driven by a voltage of an amplitude and frequency selected so as to generate, at the fuel injector outlet, fluctuations and pulses in the flow of fuel which achieves a reduction or suppression of the combustion instabilities. The voltage is calculated from the measurement of the pressure instabilities in the combustion or afterburner chamber, and by taking into account the operating point of the engine and flight conditions.

In one embodiment of the invention, the piezoelectric device is arranged in a chamber in the fuel supply line upstream of the fuel injection orifice.

In another embodiment of the invention, the piezoelectric device is arranged in a constriction situated in the fuel supply line upstream of the injection orifice, or at the level of the injection orifice.

Other preferred features and advantages of the invention will become apparent from the following description of the preferred embodiments, given by way of non-limitative example, with reference to the attached drawings.

DESCRIPTION OF THE PREFERRED EMBODIMENT

The supply of fuel to a combustion or afterburner chamber of an aero-engine is effected by a fuel feed circuit connected to fuel injectors.

The flow Q of fuel from the outlet of an injector is governed by Bernouilli's Law:

$$Q = KS \sqrt{(\Delta P)}$$

Where KS is the injector flow coefficient and ΔP is the difference between the pressure P1 upstream and the pressure P2 downstream of the injector.

Pulsation of the fuel flow may therefore be effected in two different ways, either by variation of the fuel pressure and flow, or by variation of the injector flow coefficient.

Figure 1:
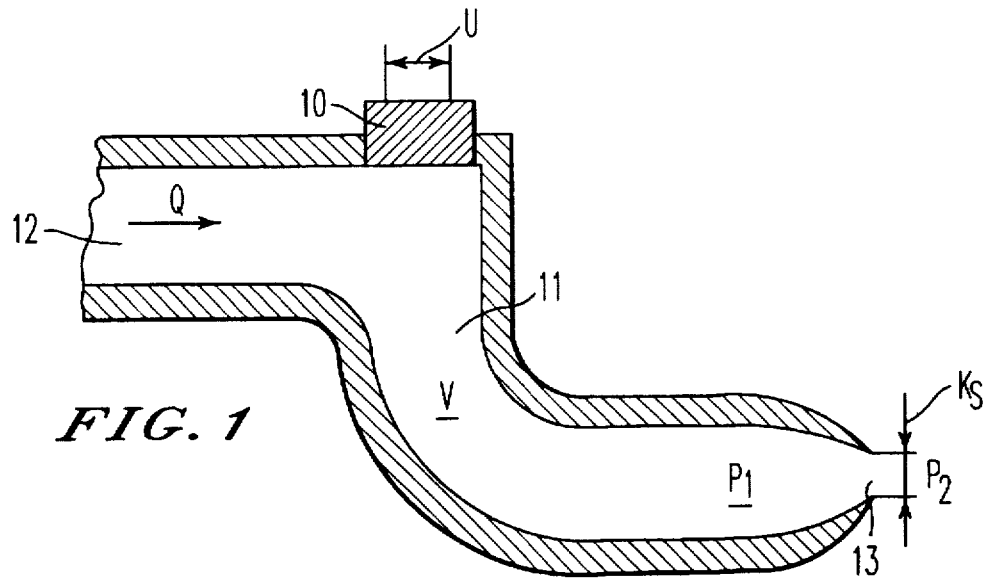
FIG. 1 represents a fuel injector in which a piezoelectric device is disposed in a chamber of volume V upstream of an injection orifice of the injector in one embodiment of a device in accordance with the invention.
Figure 2:
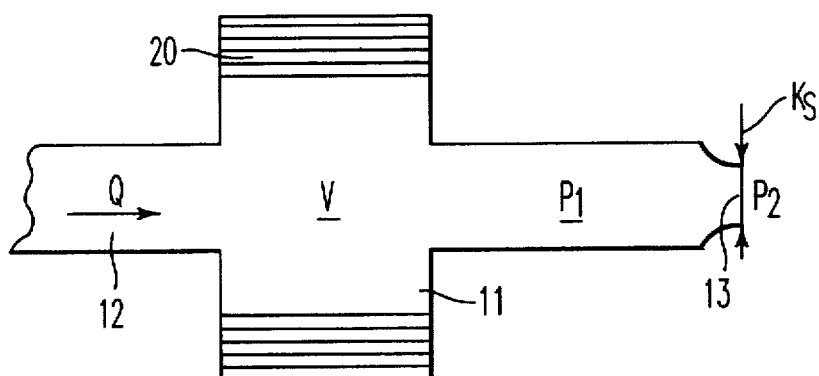
FIG. 2 is a diagrammatic representation of an alternative embodiment in which the piezoelectric device is disposed in a chamber of volume V upstream of the fuel injection orifice.
Figure 4:
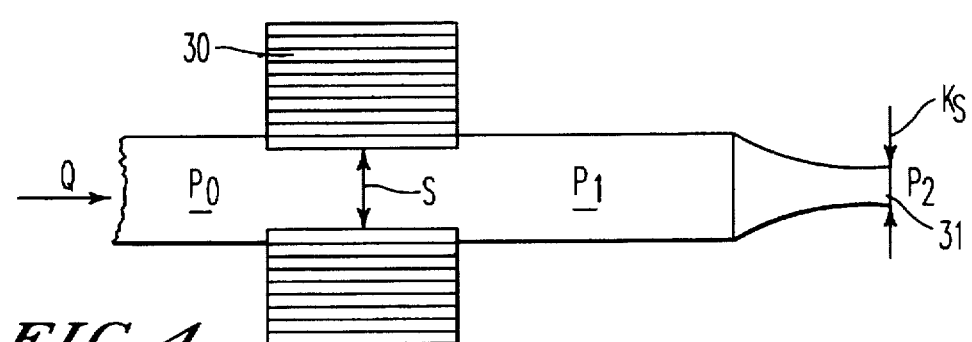
FIG. 4 is a view similar to FIG. 2, but showing an embodiment in which the piezoelectric device is disposed in a constriction upstream of the injection orifice.

Examples of how fuel flow pulses may be generated by varying fuel pressure and flow are shown in FIGS. 1, 2 and 4.

In FIGS. 1 and 2, variations of fuel pressure and flow are obtained by variations of the volume of a chamber of nominal volume V. For this purpose, a piezoelectric device 10, 20 is inserted in a chamber of volume V situated in the hydraulic fuel supply line upstream of the fuel injection orifice, the latter having a flow coefficient of KS. In FIG. 1, chamber 11 of volume V is formed by an inner cavity of the fuel injector situated between a fuel intake 12 and the fuel injection orifice 13. In FIG. 2, the chamber of volume V is an inner cavity of a piezoelectric coil 20 inserted in the hydraulic fuel supply line upstream of the fuel injector.

When the piezoelectric device is energized by a voltage U, it becomes deformed and brings about a variation of the volume of the chamber. At low frequencies, that is to say frequencies below the resonant frequency of the fluid in the duct, the variation of the volume V of the chamber 11 causes variations in the fuel volume and thus creates variations in the fuel flow.

At high frequency, i.e. at frequencies greater than the resonant frequency of the fluid in the duct, the variation of the volume V of the chamber 11 causes a pressure wave with a frequency and amplitude depending respectively on the frequency and virtual (r.m.s.) value of the energising voltage of the piezoelectric device. The pressure variations thus cause variations in the fuel flow.

At medium frequency, both aspects are present, the system being more effective as the frequency of the fuel flow pulses required to reduce combustion instabilities is greater.

Figure 3A:
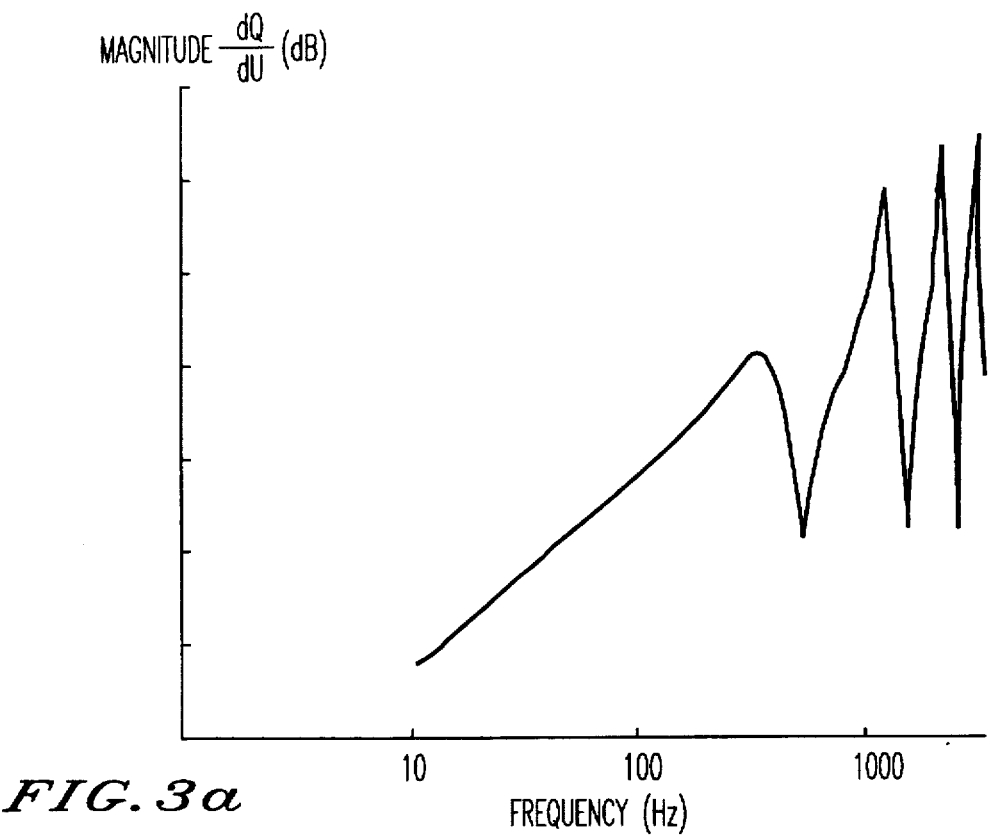
FIG. 3a shows an example of the response of embodiments corresponding to FIGS. 1 and 2, depending on frequency, when the fluid flow is at a minimum.
Figure 3B:
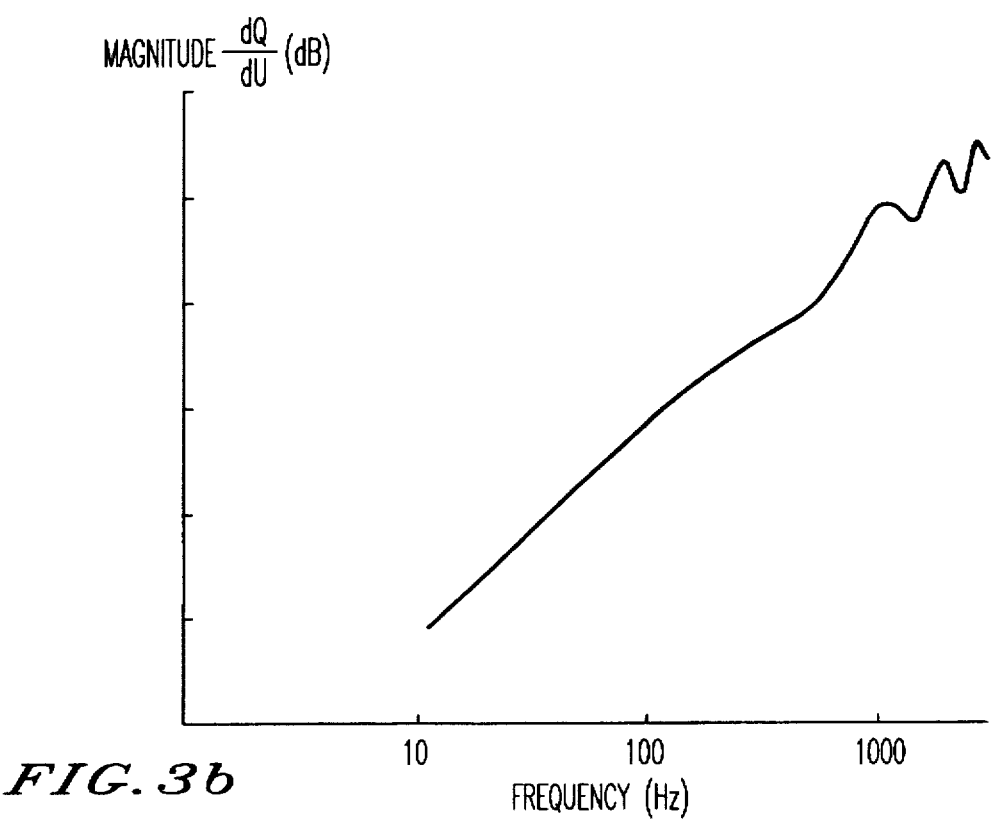
FIG. 3b shows an example of the response of embodiments corresponding to FIGS. 1 and 2, depending on frequency, when the fluid flow is at a maximum.

Examples of the response of such a system as a function of frequency are shown in FIGS. 3a and 3b for two different fluid flows, these fluid flows being respectively at a minimum and at a maximum. The two curves represent the magnitude dQ/dU (Q and U being respectively the fluid flow and the voltage applied) as a function of frequency, and show that the flow pulses are proportional to frequency when the amplitude of the voltage applied is constant.

In FIG. 4, the variations in fuel pressure and flow are obtained by variations of an intermediate flow coefficient. For this purpose, a piezoelectric coil 30 of cross-section S smaller than the cross-section of the hydraulic fuel supply line, hence forming a constriction, is connected in the hydraulic line upstream of the injection orifice 31. When the piezoelectric coil 30 is energized by a voltage, it becomes deformed and causes variations dS of the cross-section S of the coil. These variations dS act on the pressure P1 downstream of the coil, modulating it by a value dP1 and thus creating fluctuations in the fuel flow.

Preferably, the piezoelectric coil 30 is made using a film of polyvinylidene fluoride (PVDF) wound in multiple layers to form a coil. This produces a magnification of the constriction effect due to the multitude of layers of the piezoelectric film.

Figure 5:
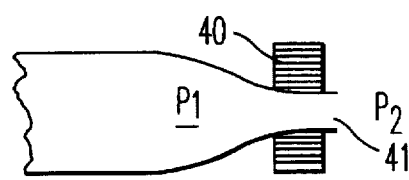
FIG. 5 is a view similar to FIG. 4, but showing an embodiment in which the piezoelectric device is placed at the fuel injection orifice.

FIG. 5 illustrates an embodiment in which fuel flow pulses are produced by variation of the injector flow coefficient. In this case a piezoelectric coil 40 is arranged at the injection orifice 41 of the fuel injector. Under the action of the energizing voltage, the coil becomes deformed and brings about changes in the cross-section of the injector orifice and of its flow coefficient KS.

However, there are technological difficulties with the implementation of this embodiment, due mainly to the temperature of the injectors. The embodiments shown in FIGS. 1, 2 and 4 do not suffer from this drawback as the piezoelectric device can be sited in a cold zone.

Figure 6:
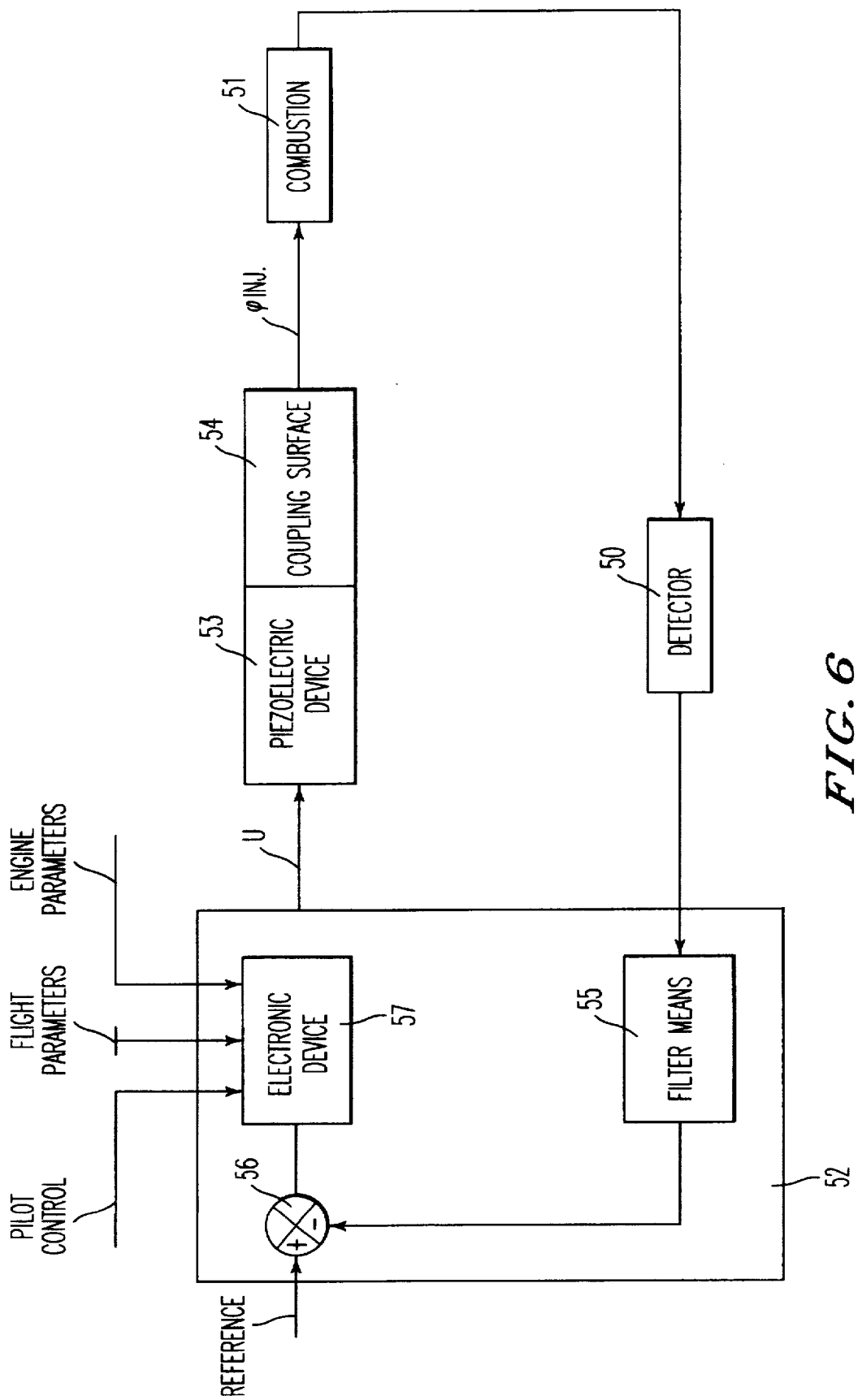
FIG. 6 is a block diagram of a complete device in accordance wit h the invention for the active control of combustion instabilities in a combustion or afterburner chamber of an aero-engine.

FIG. 6 shows a block diagram of a complete device in accordance with the invention for the active control of combustion instabilities in a combustion or afterburner chamber. As shown, the device includes a detector 50 for measuring pressure instabilities in the combustion or afterburner chamber 51, and means 52 for processing the signal output by the detector 50 and generating a feedback voltage U for the control of a piezoelectric device 53 connected in a hydraulic fuel supply line for the combustion or afterburner chamber. In response to the control voltage, the piezoelectric device becomes deformed and acts directly on the fuel by means of flow or pressure variations, and thus generates pulses in the fuel flow from the outlet of the injectors, the amplitude and the frequency of the pulses being functions of the amplitude and the frequency respectively of the control voltage.

During active control of combustion instabilities, which corresponds to a normal utilization of the piezoelectric device, the fuel flow pulses at the outlet of the injectors are between 1% and 10% of the maximum fuel flow, and the fuel flow pulsation frequency is between 200 Hz and 3000 Hz. For this range of frequencies it is necessary to carry out a mechanical impedance matching between the piezoelectric device 53 and the hydraulic fuel supply line.

This impedance matching is effected by optimizing the size of the contact surface between the piezoelectric device and the hydraulic line. This contact surface may be the surface of the piezoelectric device itself, or a hydromechanical coupling surface 54 situated between the piezoelectric device and the hydraulic line. In the latter case, the size of the piezoelectric device may be as desired, which permits the use of a standard piezoelectric device, whereas the coupling surface 54 is of a size adjusted to optimize the impedance matching. The coupling surface 54 is made of a material of sufficient rigidity, for example metal, to transmit directly the deformations of the piezoelectric device in the form of a variation of the pressure applied to the hydraulic line. The pressure variation then brings about a variation of the fuel flow.

The detector 50 for measuring pressure instabilities in the combustion or afterburner chamber 51 may be, for example, a piezoelectric sensor or an optical sensor. The means 52 for processing the signal output by the pressure instability detector 50 includes means 55 for filtering out the static component of the measured signal to derive a signal corresponding to the pressure fluctuations in the chamber 51, means 56 for comparing the pressure fluctuation signal obtained from the filter means 55 with a set value, and an electronic device 57 for calculating, depending on the result of comparison, a control voltage U for the piezoelectric device 53 to reduce the pressure fluctuations in the combustion or afterburner chamber. The electronic device may be a computer which receives the signal and performs a calculation based on correlations between the voltage of the piezoelectric device and the desired pressure variations as would be known to one skilled in the art.

The electronic device 57 enables the frequency of the voltage applied to the piezoelectric device 53 to be varied so as to modulate the variations of the fuel flow Q, and also the amplitude U of the voltage applied to the piezoelectric device to be varied so as to optimize the maximum power for obtaining variations of the flow of fuel of predetermined maximum value dQ. The maximum value dQ max is determined as a function of parameters of the aircraft and of the engine, particularly the operating point of the engine and the flight conditions. For example, the maximum value dQ max may be selected to be equal to 2% of maximum fuel flow in certain conditions, and 4% in other conditions.

The device in accordance with the invention for the active control of combustion instabilities using a piezoelectric device has the advantage that it may be used also for decoking the fuel injectors. In this decoking operation, the electronic device 57 is made to produce high amplitude, high frequency voltage pulses in the range of ultrasonic waves, for example of the order of several kHz. In this case, the cleaning of the injectors is carried out in situ without dismantling the injectors, which makes maintenance easier and quicker.

The application of high frequency pulses may be controlled automatically by the electronic device. During this operation, the voltage and frequency values are adjusted so as to be within injector cleaning conditions. The application of the high frequency pulses may also be controlled directly from the cockpit by ground maintenance teams.

What we claim is:

1. A device for actively controlling combustion instabilities in a combustion chamber provided with a hydraulic line for the supply of fuel to said chamber and a fuel injector defining an injection orifice, and for decoking said fuel injector, said device comprising at least one detector for measuring pressure fluctuations in said combustion chamber and providing an output signal, means for processing said output signal from said detector and providing, in turn, a control voltage, and at least one piezoelectric device capable of ultrasonic operation disposed in said hydraulic fuel supply line for generating, in response to said control voltage, pulses in the flow of fuel from said injection orifice of said fuel injector.

2. A device according to claim 1, wherein said piezoelectric device is disposed in a chamber defined in said hydraulic fuel supply line upstream of said injection orifice.

3. A device according to claim 1, wherein said piezoelectric device is disposed in a constriction defined in said hydraulic fuel supply line upstream of injection orifice.

4. A device according to claim 1, wherein said piezoelectric device is disposed in a constriction defined in said hydraulic fuel supply line at said injection orifice.

5. A device according to claim 1, wherein said device further comprises hydromechanical coupling means disposed between said piezoelectric device and said hydraulic fuel supply line.

6. A device according to claim 5, wherein said hydromechanical coupling means is formed by a surface of predetermined dimensions such as to achieve an impedance matching between said piezoelectric device and said hydraulic fuel supply line.

7. A device according to claim 1, wherein said means for processing said output signal from said detector and providing said control voltage comprises means for filtering out the static component of said output signal to derive a signal corresponding to said pressure fluctuations, means for comparing said signal corresponding to said pressure fluctuations with a predetermined value, and an electronic device for determining said control voltage for said piezoelectric device.

8. A device according to claim 7, wherein, said electronic device develops high frequency voltage pulses in the range of ultrasonic waves.

9. A device according to claim 8, wherein said high frequency voltage pulses are triggered automatically by said electronic device.

10. A device according to claim 8, wherein said high frequency voltage pulses are manually triggered.

11. A device for actively controlling combustion instabilities in an afterburner chamber provided with a hydraulic line for the supply of fuel to said chamber and a fuel injector defining an injection orifice, and for decoking said fuel injector, said device comprising at least one detector for measuring pressure fluctuations in said afterburner chamber and providing an output signal, means for processing said output signal from said detector and providing, in turn, a control voltage, and at least one piezoelectric device capable of ultrasonic operation disposed in said hydraulic fuel supply line for generating, in response to said control voltage, pulses in the flow of fuel from said injection orifice of said fuel from said injection orifice of said fuel injector.

12. A device for decoking a fuel injector in a combustion chamber provided with a hydraulic line for the supply of fuel, said device comprising at least one detector for measuring pressure fluctuations in said combustion chamber and providing an output signal, means for processing said output signal from said detector and providing, in turn, a control voltage, and at least one piezoelectric device disposed in said hydraulic fuel supply line for generating, in response to said control voltage, pulses in the range of ultrasonic waves in the flow of fuel from an injection orifice of said fuel injector.

* * * * *